Figure 1:
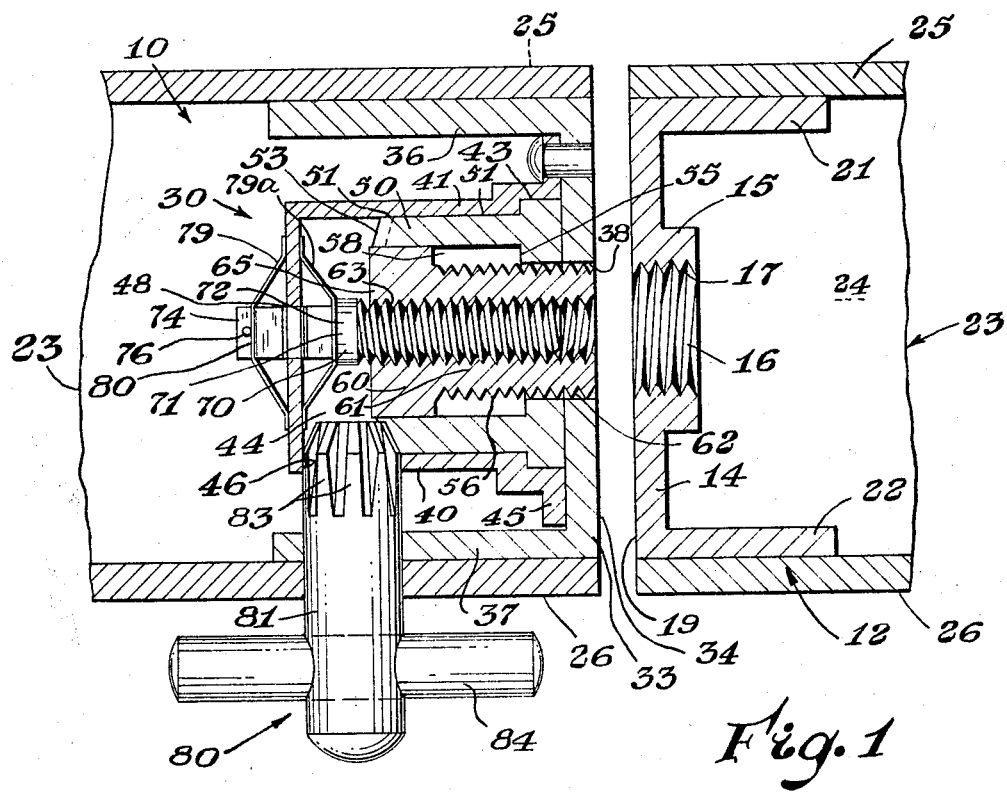

Aug. 2, 1966    I. S. HOUVENER ETAL    3,264,019
JOINING DEVICE FOR STRUCTURES
Filed Jan. 6, 1964    2 Sheets-Sheet 1

INVENTORS.
Irving S. Houvener
Albert J. Palfey
BY
Robert B. Ingraham AGENT
ATTORNEY Aug. 2, 1966     I. S. HOUVENER ETAL     3,264,019
JOINING DEVICE FOR STRUCTURES Filed Jan. 6, 1964     2 Sheets-Sheet 2

INVENTORS.
Irving S. Houvener
Albert J. Palfey
BY
AGENT
ATTORNEY

United States Patent Office 3,264,019
Patented August 2, 1966

3,264,019
JOINING DEVICE FOR STRUCTURES
Irving S. Houvener and Albert J. Palfey, Midland, Mich., assignors to The Dow Chemical Company, Midland, Mich., a corporation of Delaware
Filed Jan. 6, 1964, Ser. No. 335,834
3 Claims. (Cl. 287—189.35)

This invention relates to joining devices. It more particularly relates to an improved joining device for butt joints in which a high degree of rigidity is required.

Building structures frequently are prepared utilizing prefabricated panels which are joined together to provide a completed building assembly. Oftentimes it is desirable to utilize such panels in a manner that does not require a framework in or on it to support the panels and to join the panels together in such a manner that smooth wall surfaces are obtained without projecting cap strips or other devices to maintain the panels in engagement. Further, oftentimes it is desired that such panels be maintained in rigid relationship to each other. It is desirable that when such panels are assembled that it be done without the aid of large tools, jigs, or similarly bulky assemblies. Such structures are generally lacking in known fasteners for such panels.

Therefore, it is an object of this invention to provide an improved fastener for panels which is adapted to be placed in the edge portions thereof.

It is a further object of this invention to provide an improved fastener which provides a rigid connection and maintains the panels in fixed relationship to each other.

It is a further object of the invention to provide an improved fastener which may be manually tightened readily and easily.

These objects and other features and advantages of the invention are readily achieved in accordance with the invention by providing a fastener assembly comprising (1) a strike portion defining an internally threaded aperture (2) a latch portion comprising a body, a body having a surface adapted to engage the strike, a sleeve retainer oppositely disposed from the strike engaging surface and rigidly mounted to the body, the sleeve retainer defining a key aperture and a leader retaining means remotely disposed from the strike engaging surface, a sleeve disposed within the sleeve retainer, the sleeve defining a generally centrally disposed aperture, the walls of the centrally disposed aperture defining a configuration adapted to engage a screwhead, the sleeve having a body engaging surface and being rotatably restrained within its sleeve retainer and adapted to rotate about an axis generally normal to the strike engaging surface, a sleeve rotating means operable from a direction generally perpendicular to the axis of rotation of the sleeve, a screw disposed within the sleeve, the screw having a head portion disposed remotely from the strike engaging surface, the head portion adapted to slide within and be rotated by the sleeve, means to resiliently urge the screw in the direction of the strike engaging surface.

Figure 2:
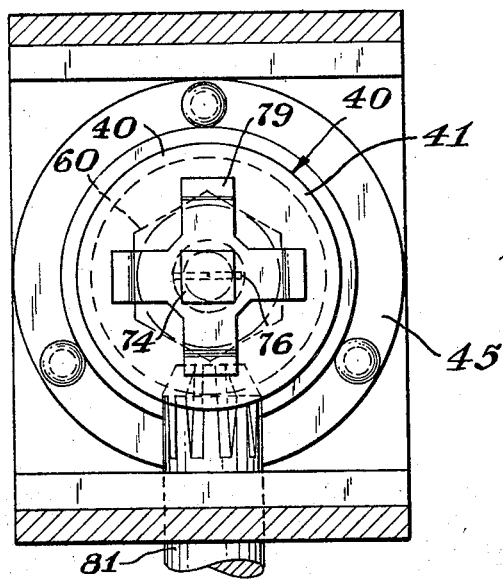
Figure 3:
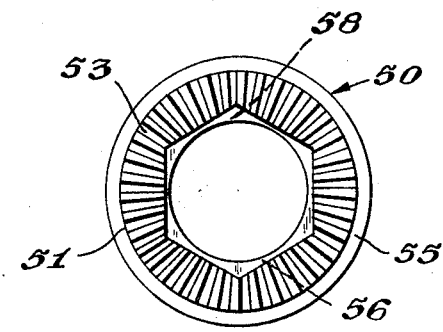
Figure 4:
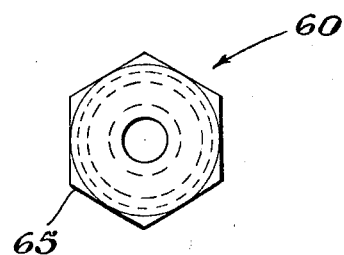
Figure 5:
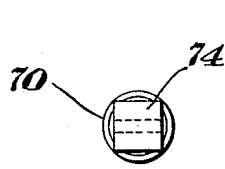
Figure 6:
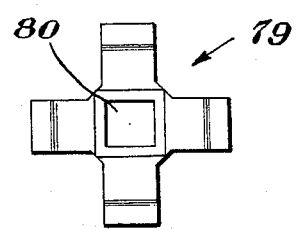

Further features and advantages of the present invention are apparent from the following specification when taken in connection with the drawing wherein:

FIGURE 1 shows a sectional view of a fastener in accordance with the invention installed in panels;
FIGURE 2 depicts an end view of the portion of the sleeve retainer and body of the fastener;
FIGURE 3 depicts an end view of the sleeve of FIGURE 1;
FIGURE 4 is an end view of the screw of FIGURE 1;
FIGURE 5 is an end view of the leader of FIGURE 1;
FIGURE 6 is an end view of the springs utilized in the fastener of FIGURE 1.

In FIGURE 1 there is illustrated a sectional view of a latch assembly 10 in accordance with the present invention. The assembly 10 comprises a strike 12. The strike 12 comprises a strike plate 14. Within the strike plate 14 is a boss 15. The boss 15 defines an aperture 16 having internal threads 17. The strike plate 14 has a latch engaging face 19. Mounting flanges 21 and 22 are affixed to the strike plate 14 to provide mounting means. The strike 12 is shown mounted in a panel 23 having a core 24 and face sheets 25 and 26. Oppositely disposed to the strike 12 is a latching mechanism 30 disposed within a similar panel 23. The latching mechanism 30 comprises a body 33. The body 33 defines a strike engaging face 34, dependent flanges 36 and 37 adapted to engage the face sheets 25 and 26. The strike body 33 also defines an aperture 38 which is so positioned as to correspond to the aperture 16 of the strike 12. A sleeve retainer 40 is provided and affixed to the body 33 remote from the strike engaging face 34. The sleeve retainer 40 comprises a body portion 41 defining an internally disposed annular recess 43 and a body engaging flange 45. The body 41 defines a generally cylindrical cavity 44 and a key aperture 46 opening in a direction generally normal to the axis of the cylindrical cavity 44. Within the body of the sleeve retainer 40 is defined a leader retaining aperture 48. This aperture 48 is generally axially disposed in relation to the cavity 44. Rotatably disposed within the cavity 44 is a drive sleeve 50. The drive sleeve 50 has a generally cylindrical exterior surface 51 having disposed at one end thereof a key engaging teeth or drive means 53. Remotely disposed from the key engaging teeth 53 is a generally annular flange 55. The flange 55 is adapted to engage the annular recess 43 within the sleeve retaining body 41. A portion of the flange 55 defines an aperture 56 which is generally coaxial and about the size of the aperture 38. The sleeve 50 defines an internal cavity 58 in full communication with the aperture 56. The internal cavity 58 is of noncylindrical configuration and adapted to engage a screwhead. Disposed within the cavity 58 is a screw 60. The screw 60 has a body portion 61 having external threads 62 and internal threads 63. The external threads 62 are adapted to engage the internal threads 17 of the strike 12. At the end of the screw remote from the strike face 34 is a head 65 adapted to slide within the cavity 58 of the sleeve 50 and be held in a nonrotatable manner. Disposed within the screw 60 is a leader or guide 70. The guide 70 comprises an externally threaded portion 71 adapted to engage the internal threads 63 of the screw 60. Remote from the threaded body portion 71 is a shoulder 72, and affixed to the shoulder 72 remote from the threads 71 is a shank 74. At the terminal portion of the shank 74 there is disposed a retaining pin 76. A spring 79 having an aperture 80 is positioned over the shank 74 in such a manner that it bears against the sleeve housing 40 and the retaining pin 76. A similar spring 79a bears against the shoulder 72 and against the inner portion of the sleeve retainer 40. Disposed within the key aperture 46 is a key or operating means 80. The key 80 comprises a body portion 81 having disposed at one end thereof a plurality of teeth 83 adapted to mate with the sleeve driving means 53. Remotely disposed from the teeth 83 is a handle portion 84.

FIGURES 2, 3, 4, 5 and 6 illustrate end views of the latching mechanism, the sleeve retainer 40, the sleeve 50, the screw 60, the leader 70, and the spring 79, respectively. Operation of the fastener in accordance with the present invention is readily understood by reference FIGURES 1–6. In order to engage the fastener 10, the members containing the strike 12 and the latching mechanisms the strike 12 and the aperture 38 of the latching mechanism 30 are in coaxial alignment. Rotation of the key 84 causes the sleeve 50 to rotate which in turn causes the screw 60 to rotate, the leader 70 is retained in nonrotating resilient relationship with the sleeve retainer 40 by 30 are aligned in such a manner that the aperture 16 of means of the leader retaining means and the springs 79 and 79A. Thus, the screw 60 is caused to advance to the aperture 16 of the strike 12. As rotation is continued and the screw 50 engages the aperture 16 the springs 79 and 79A permit axial motion of the leader 70 until the external thread on the screw starts on the internal thread 17 of the strike 12. As rotation is continued the screw 50 advances to the thread and the face 19 of the strike 12 is drawn tightly against the face 34 of the body 33. The latching assembly may be readily disassembled or disengaged by reversing the rotation of the key and a rigid attachment is provided thereby. Fasteners in accordance with the present invention are found extremely satisfactory for joining panels and structures of various natures.

As is apparent from the foregoing specification, the manufacture of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A fastener assembly for joining two members together, the fastener assembly comprising;
   (a) a strike portion defining an internally threaded aperture,
   (b) a latch portion comprising a body,
       the body having a surface adapted to engage the strike,
       a sleeve retainer oppositely disposed from the strike engaging surface and rigidly mounted to the body,
       the sleeve retainer defining an access aperture and a retaining means remotely disposed from said strike retaining surface,
       a sleeve disposed within said sleeve retainer said sleeve defining a generally centrally disposed aperture, the walls of said centrally disposed aperture having a configuration adapting to engage a screw head, the sleeve having a body engaging surface and being rotatably retained within the sleeve retainer and adapted to rotate about an axis normal to the strike engaging surface, a sleeve rotating means operable from a direction generally perpendicular to the axis of rotation of the sleeve,
       a screw disposed within the sleeve, the screw having an end portion disposed remotely from the strike engaging surface, the head portion adapted to slide within and be rotated by the sleeve,
       and means to resiliently urge the screw in the direction of the strike engaging surface.

2. A fastener assembly for joining two members together, the fastener assembly comprising;
   (a) a strike portion defining an internally threaded aperture, a planar latch engaging face, the aperture extending generally normally to the face,
   (b) a latch portion comprising a hollow body,
       the body having a surface adapted to engage the strike, and a screw passing aperture adapted to be disposed adjacent to the strike aperture,
       a sleeve retainer oppositely disposed from the strike engaging surface and mounted to the body,
       the sleeve retainer defining an access aperture and a retaining means remotely disposed from said strike retaining surface,
       a sleeve disposed within said sleeve retainer said sleeve defining a generally centrally disposed aperture, the walls of said centrally disposed aperture having a configuration adapting to engage a screw head, the sleeve having a body engaging surface and being rotatably retained with the sleeve retainer and adapted to rotate about an axis normal to the strike engaging surface, the sleeve defining a sleeve rotating means accessible from a direction generally parallel to the strike engaging surface,
       a screw disposed within the sleeve, the screw having an end portion disposed remotely from the strike engaging surface, the head portion adapted to slide within and be rotated by the sleeve,
       the screw defining a centrally disposed internally threaded passageway generally coaxial with the external threads of the screw,
       a leader partially disposed within the sleeve retainer and partially disposed within the passageway within the screw, the leader being externally threaded and adapted to mate with the external threads of the passageway of the screw and to engage the leader retaining means and be retained slidably and non-rotatably therein.

3. The assembly of claim 2 wherein a pair of opposed spring members resiliently secure the leader to the sleeve retaining means.

References Cited by the Examiner

UNITED STATES PATENTS

| | | | |
|---|---|---|---|
| 1,170,344 | 2/1916 | Ryan | 292—251 |
| 2,532,630 | 12/1950 | Lickteig | 292—142 |

HARRISON R. MOSELEY, *Primary Examiner.*

A. I. BREIER, *Assistant Examiner.*